United States Patent
Yun et al.

(10) Patent No.: US 7,824,038 B2
(45) Date of Patent: Nov. 2, 2010

(54) METHOD FOR CONTROLLING DUAL LAMP MODULE

(75) Inventors: Chi-Chui Yun, Hsinchu (TW); Pin-Chun Huang, Hsinchu (TW); Wei-Sheng Chang, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 503 days.

(21) Appl. No.: 11/851,874

(22) Filed: Sep. 7, 2007

(65) Prior Publication Data

US 2008/0297053 A1 Dec. 4, 2008

(30) Foreign Application Priority Data

May 28, 2007 (TW) ................ 96118911 A

(51) Int. Cl.
G03B 21/26 (2006.01)

(52) U.S. Cl. .............. 353/58; 353/52; 353/57; 353/85; 353/87; 353/89; 353/94; 353/119; 353/121; 353/122; 362/218; 362/264; 362/294; 362/373; 348/745; 348/746; 348/748

(58) Field of Classification Search ........... 353/87, 353/85, 52, 58, 94, 121, 89, 57, 119, 122; 362/218, 264, 294, 373; 348/745, 746, 748
See application file for complete search history.

(56) References Cited

U.S. PATENT DOCUMENTS

| 4,048,486 | A | 9/1977 | Kriege |
|---|---|---|---|
| 4,461,974 | A | 7/1984 | Chiu |
| 6,623,122 | B1 * | 9/2003 | Yamazaki et al. ............. 353/30 |
| 6,857,761 | B2 * | 2/2005 | Chang ......................... 362/234 |
| 2006/0119802 | A1 * | 6/2006 | Akiyama ..................... 353/94 |
| 2006/0146296 | A1 * | 7/2006 | Lin .............................. 353/94 |
| 2007/0165185 | A1 * | 7/2007 | Chen ........................... 353/20 |

* cited by examiner

Primary Examiner—Georgia Y Epps
Assistant Examiner—Sultan Chowdhury
(74) Attorney, Agent, or Firm—J.C. Patents

(57) ABSTRACT

A method for controlling a dual lamp module applied to a projection apparatus is provided. The dual lamp module includes a first lamp and a second lamp. The method for controlling a dual lamp module includes providing a first operating power to the first lamp, and then determining whether the first lamp is turned on or not. If the first lamp fails to be turned on, stopping providing the first operating power to the first lamp, and providing a second operating power to the second lamp. The second operating power is greater than the first operating power.

14 Claims, 5 Drawing Sheets

METHOD FOR CONTROLLING DUAL LAMP MODULE

CROSS-REFERENCE TO RELATED APPLICATION

This application claims the priority benefit of Taiwan application serial no. 96118911, filed on May 28, 2007. All disclosure of the Taiwan application is incorporated herein by reference.

BACKGROUND OF THE INVENTION

1. Field of the Invention

The present invention relates to a method for controlling a dual lamp module. More particularly, the present invention relates to a method for controlling a dual lamp module applied to a projection apparatus.

2. Description of Related Art

Along with the development of science and technology, the requirements on brightness of projection apparatuses are increasingly advanced, so projection apparatuses using a single lamp cannot meet the requirements on high brightness. Accordingly, projection apparatuses using multiple lamps are developed.

In the conventional art, a projection apparatus improves its brightness in use by increasing the number of lamps, such that the projection apparatus can be applied in an open environment or in situation requiring high-brightness projection apparatuses. However, if the projection apparatus having dual lamps in use encounters the problem that one lamp is extinguished or damaged unexpectedly, the user finds the brightness of images projected by the projection apparatus is obviously insufficient.

In detail, when one lamp of the projection apparatus having dual lamps is extinguished or damaged in a sudden, the brightness of images projected by the projection is reduced by a half. Therefore, the user finds an obvious sudden reduction of the brightness of images provided by the projection apparatus, and then finds that the images projected by the projection apparatus turn into unclear in a sudden.

SUMMARY OF THE INVENTION

Accordingly, the present invention is directed to a method for controlling a dual lamp module, which enhances the brightness of illumination beam provided by the other lamp when one lamp fails to be turned on or is extinguished or damaged unexpectedly in use, so as to solve the problem existing in the conventional art.

As embodied and broadly described herein, a method for controlling a dual lamp module including a first lamp and a second lamp and being applied to a projection apparatus is provided in embodiments of the present invention. The method for controlling a dual lamp module includes providing a first operating power to the first lamp, and then determining whether the first lamp is turned on or not. If the first lamp fails to be turned on, stopping providing the first operating power to the first lamp, and providing a second operating power to the second lamp. The second operating power is greater than the first operating power.

The embodiments of the present invention are further described briefly as follows.

A first operating power is provided to the first lamp and the second lamp respectively, and the first lamp and the second lamp are determined whether to be turned on or not. If the first lamp or the second lamp fails to be turned on, stopping providing the first operating power to the lamp that fails to be turned on, and changing the first operating power provided to the lamp that is turned on to a second operating power. The second operating power is greater than the first operating power.

In the projection apparatus adopting the method for controlling a dual lamp module, when one of the two lamps fails to be turned on or is extinguished, the projection apparatus adjusts to enhance the brightness of illumination beam provided by the other lamp, so as to maintain the brightness of images or alleviate attenuation of the brightness of images.

Other objectives, features and advantages of the present invention will be further understood from the further technology features disclosed by the embodiments of the present invention wherein there are shown and described preferred embodiments of this invention, simply by way of illustration of modes best suited to carry out the invention.

DESCRIPTION OF EMBODIMENTS

It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and "coupled," and variations thereof herein are used broadly and encompass direct and indirect connections, couplings, and mountings.

Figure 1A:
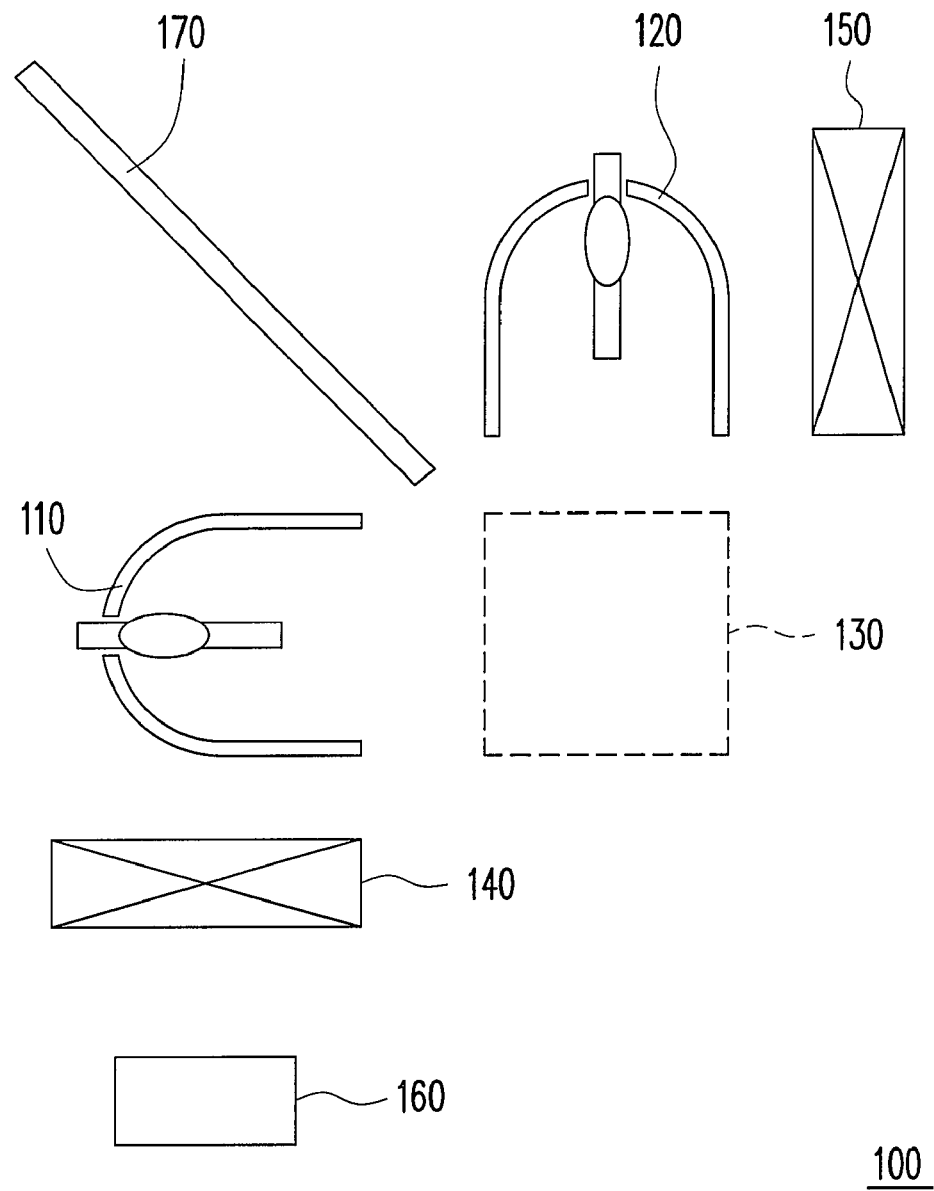
FIG. 1A is a schematic structural view of a dual lamp module according to a first embodiment of the present invention.
Figure 1B:
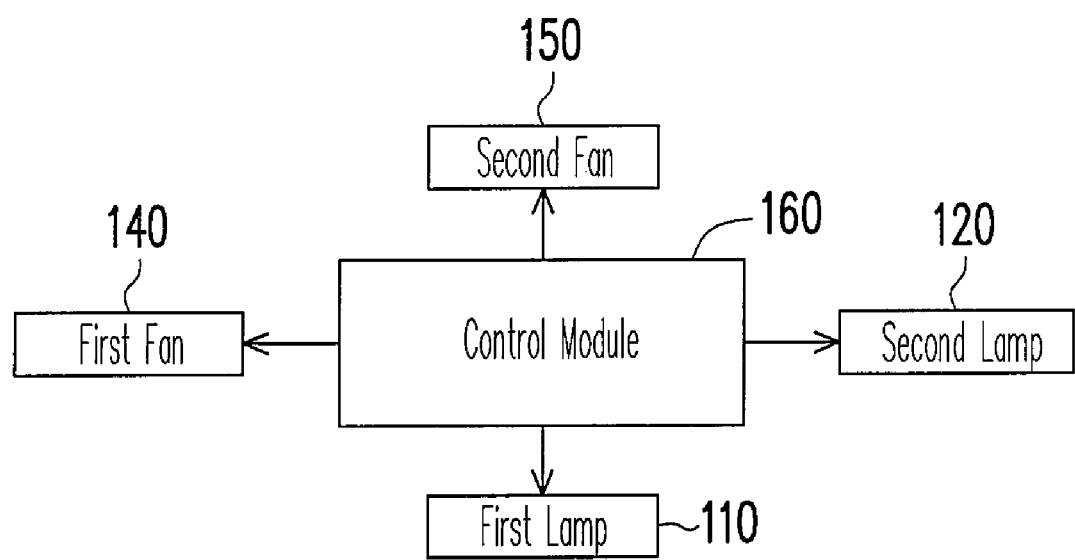
FIG. 1B is a schematic block diagram of a dual lamp module according to the first embodiment of the present invention.

Referring to FIGS. 1A and 1B, a dual lamp module 100 applied to a projection apparatus (not shown) of the first embodiment of the present invention includes a first lamp 110, a second lamp 120, an beam combining component 130, a first fan 140, a second fan 150, a control module 160, and a spacer 170. The first lamp 110 and the second lamp 120 are capable of respectively providing an illumination beam. Optical paths of the two illumination beams provided by the first lamp 110 and the second lamp 120 are orthogonal, and the beam combining component 130 is disposed on the optical paths of the two illumination beams. The first fan 140 is disposed near the first lamp 110, and is capable of cooling the first lamp 110. The second fan 150 is disposed near the second lamp 120, and is capable of cooling the second lamp 120. The control module 160 is electrically connected to the first lamp 110, the second lamp 120, the first fan 140, and the second fan 150. The spacer 170 is disposed between the first lamp 110 and the second lamp 120 for separating the cooling airflow provided by the first fan 140 and the cooling airflow provided by the second fan 150. The first lamp 110 and the second lamp 120, for example, are bulbs or light emitting diodes (LEDs). The first fan 140 and the second fan 150, for example, are blowers or axial fans.

Figure 2:
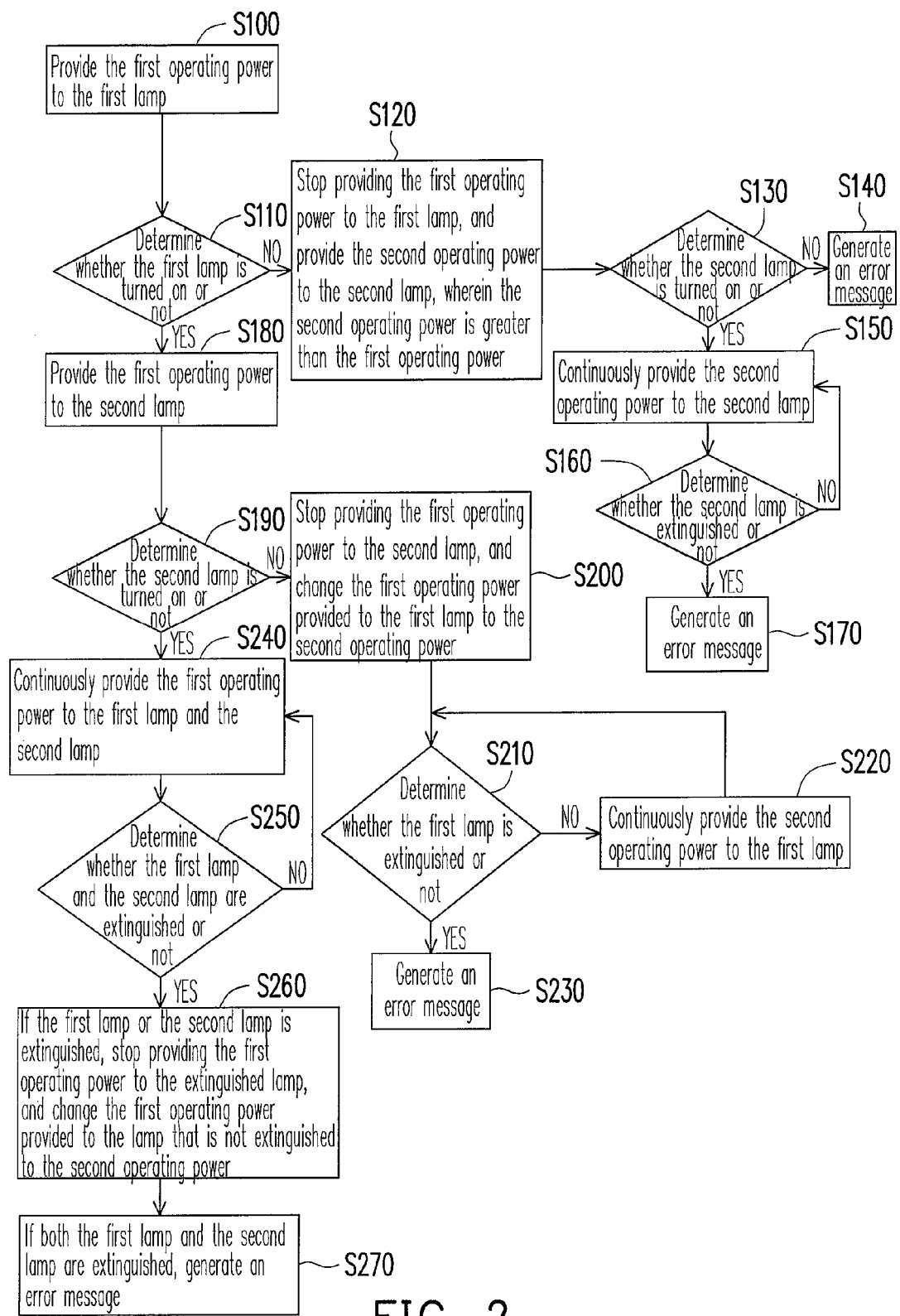
FIG. 2 is a flow chart of a method for controlling a dual lamp module according to the first embodiment of the present invention.

Referring to FIG. 1A to FIG. 2, a method for controlling the dual lamp module according to the first embodiment of the present invention includes the following steps.

Firstly, when the projection apparatus is turned on, a power supplier (not shown) of the projection apparatus provides a first operating power to the first lamp 110 through the control module 160 (S100). Then, the control module 160 determines whether the first lamp 110 is turned on or not (S110). If the first lamp 110 fails to be turned on, the power supplier stops providing the first operating power to the first lamp 110 through the control module 160, and provides a second operating power to the second lamp 120 through the control module 160. The second operating power is greater than the first operating power (S120).

In detail, a preset mode of the control module 160, for example, is that the power supplier provides the first operating power to the first lamp 110 and the second lamp 120 through the control module 160. However, when the control module 160 determines that the first lamp 110 fails to be turned on, the power supplier stops providing the first operating power to the first lamp 110 through the control module 160. Moreover, the power supplier increases the first operating power originally provided to the second lamp 120 to the second operating power, so as to improve the brightness of the illumination beam provided by the second lamp 120.

In addition, after step S120, the control module 160 determines whether the second lamp 120 is turned on or not (S130). At this time, if the second lamp 120 fails to be turned on, the control module 160 generates an error message (S140) to remind the user to replace the first lamp 110 and the second lamp 120. If the second lamp 120 is turned on, the power supplier continuously provides the second operating power to the second lamp 120 through the control module 160 (S150). Then, the control module 160 continuously determines whether the second lamp 120 is extinguished or not (S160) until the user turns off the projection apparatus. If the control module 160 determines that the second lamp 120 is extinguished, the control module 160 generates an error message (S170) to remind the user to replace the first lamp 110 and the second lamp 120.

However, when the control module 160 determines that the first lamp 110 is turned on after Step S110, the power supplier provides the first operating power to the second lamp 120 through the control module 160 (S180). Then, the control module 160 determines whether the second lamp 120 is turned on or not (S190). If the second lamp 120 fails to be turned on, the power supplier stops providing the first operating power to the second lamp 120 through the control module 160. Moreover, the power supplier changes the first operating power provided to the first lamp 110 to the second operating power (S200), so as to enhance the brightness of the illumination beam provided by the first lamp 110. Then, the control module 160 continuously determines whether the first lamp 110 is extinguished or not (S210) until the user turns off the projection apparatus. If the control module 160 determines that the first lamp 110 is not extinguished, the power supplier continuously provides the second operating power to the first lamp 110 through the control module 160 (S220), and continuously determines whether the first lamp 110 is extinguished or not (S210) until the user turns off the projection apparatus. If the control module 160 determines that the first lamp 110 is extinguished, the control module 160 generates an error message (S230) to remind the user to replace the first lamp 110 and the second lamp 120.

Moreover, when the control module 160 detects that the second lamp 120 is turned on after Step S190, the power supplier continuously provides the first operating power to the first lamp 110 and the second lamp 120 through the control module 160 (S240). Then, the control module 160 continuously determines whether the first lamp 110 and the second lamp 120 are extinguished or not (S250) until the user turns off the projection apparatus. If the control module 160 determines that the first lamp 110 or the second lamp 120 is extinguished, the power supplier stops providing the first operating power to the extinguished lamp through the control module 160. Moreover, the power supplier changes the first operating power provided to the lamp that is not extinguished to the second operating power (S260) through the control module 160, so as to enhance the brightness of the illumination beam provided by the lamp that is not extinguished. Then, the control module 160 continuously determines whether the lamp that is not extinguished is extinguished or not until the user turns off the projection apparatus. If the control module 160 determines that both the first lamp 110 and the second lamp 120 fail to be turned on or are extinguished, the control module 160 generates an error message (S270) to remind the user to replace the first lamp 110 and the second lamp 120.

For example, if the control module 160 determines that the first lamp 110 is extinguished, the power supplier stops providing the first operating power to the first lamp 110 through the control module 160. Moreover, the power supplier changes the first operating power provided to the second lamp 120 to the second operating power, so as to enhance the brightness of the illumination beam provided by the second lamp 120. Then, the control module 160 continues to determine whether the second lamp 120 is extinguished or not until the user turns off the projection apparatus. After that, if the control module 160 determines that the second lamp 120 is extinguished as well, the power supplier stops providing the second operating power to the second lamp 120 through the control module 160, and the control module 160 generates an error message to remind the user to replace the first lamp 110 and the second lamp 120.

It is known from the above embodiment that when the first lamp 110 or the second lamp 120 fails to be turned on or is extinguished, the operating power of the other lamp of the first lamp 110 and the second lamp 120 is increased to enhance the brightness of its illumination beam, so as to maintain the brightness of images or alleviate attenuation of the brightness of images. Moreover, when both the first lamp 110 and the second lamp 120 fail to be turned on or are extinguished, an error message is generated to remind the user to replace the first lamp 110 and the second lamp 120.

Figure 3:
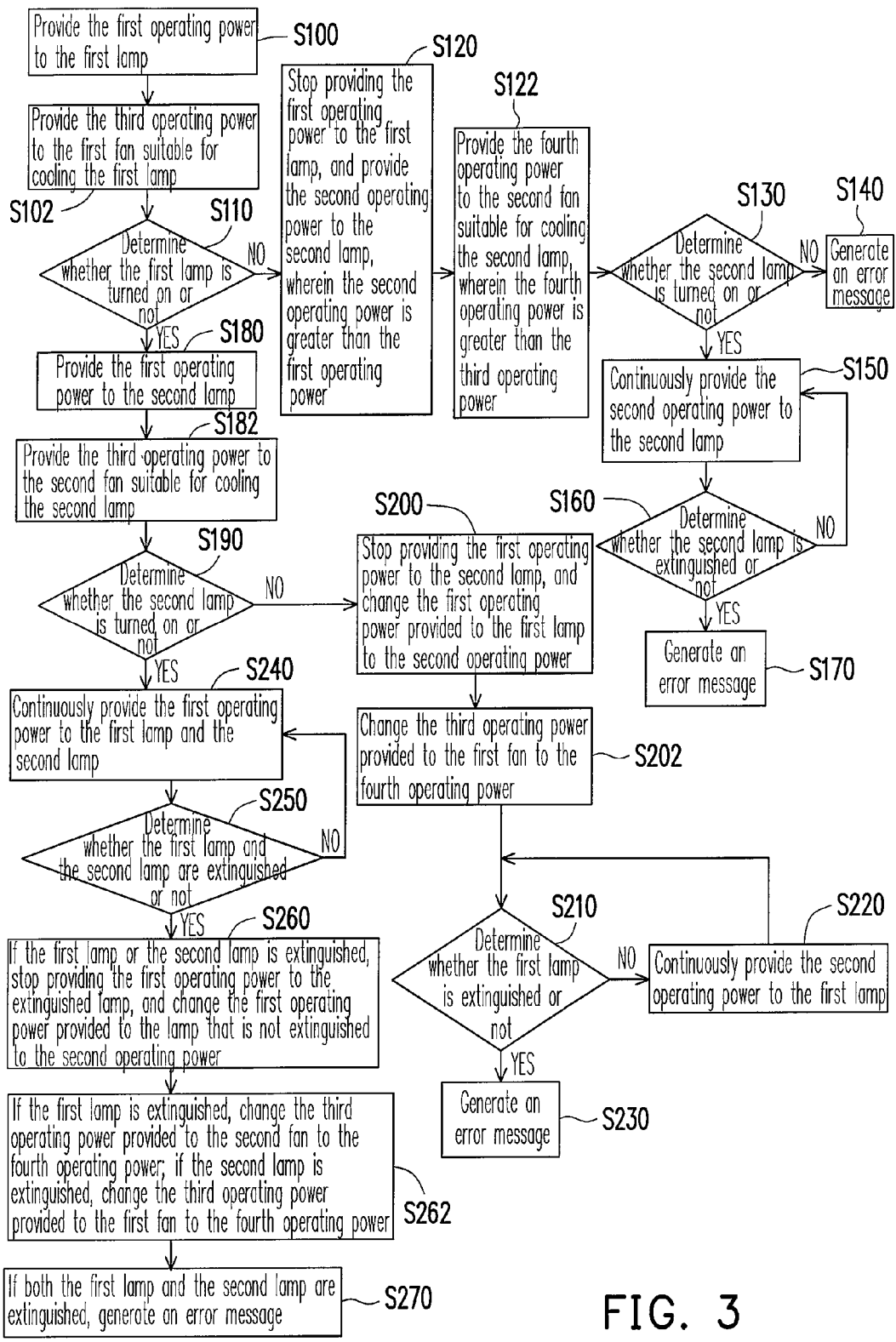
FIG. 3 is a flow chart of a method for controlling a dual lamp module according to a second embodiment of the present invention.

Referring to FIG. 3, a method for controlling a dual lamp module of a second embodiment of the present invention is substantially the same as that of the first embodiment, while the second embodiment further includes steps of controlling the first fan 140 and the second fan 150. In this embodiment, after Step S100, the power supplier provides a third operating power to the first fan 140 capable of cooling the first lamp 110 through the control module 160 (S102), such that the first fan 140 runs at a first rotation speed. After that, under the circumstances that the first lamp 110 is extinguished or fails to be turned on, the power supplier provides a fourth operating power to the second fan 150 capable of cooling the second lamp 120 (S122) through the control module 160 after Step S120, such that the second fan 150 runs at a second rotation speed. The fourth operating power is greater than or equal to the third operating power, i.e., the second rotation speed is greater than or equal to the first rotation speed. As the operating power provided to the second fan 150 through the control module 160 by the power supplier changes from the third operating power to the fourth operating power, the second fan 150 has a higher rotation speed, so that the efficiency of the second fan 150 for cooling the second lamp 120 is improved.

Moreover, under the circumstances that the first lamp 110 is turned on, the power supplier provides the third operating power to the second fan 150 capable of cooling the second fan 120 (S182) through the control module 160 after Step S180, so that the second fan 150 runs at the second rotation speed. If the second lamp 120 is extinguished or fails to be turned on, the power supplier changes the third operating power provided to the first fan 140 through the control module 160 to the fourth operating power (S202) after Step S200, so as to improve the rotation speed of the first fan 140 to the second rotation speed, and thus the efficiency of the first fan 140 for cooling the first lamp 110 is improved.

In addition, after Step S260, if the control module 160 determines that the first lamp 110 is extinguished, the power supplier changes the third operating power provided to the second fan 150 to the fourth operating power through the control module 160. In addition, if the control module 160 determines that the second lamp 120 is extinguished, the power supplier changes the third operating power provided to the first fan 140 to the fourth operating power through the control module 160 (S262).

In brief, when the first lamp 110 or the second lamp 120 is turned on, the power supplier turns on the corresponding first fan 140 or second fan 150 through the control module 160. Moreover, when the first lamp 110 or the second lamp 120 fails to be turned on or is extinguished, the power supplier changes the third operating power provided to the lamp that is not extinguished to the fourth operating power through the control module 160 to improve the rotation speed, and thus the efficiency of the fan for cooling the lamp is improved.

However, the present invention is not limited to this embodiment. For example, the power supplier turns on the lamps and the corresponding fans at the same time through the control module 160. Moreover, when the power supplier stops providing the operating power to the extinguished lamp, the operating power provided to the fan corresponding to the extinguished lamp is also stopped at the same time.

Figure 4:
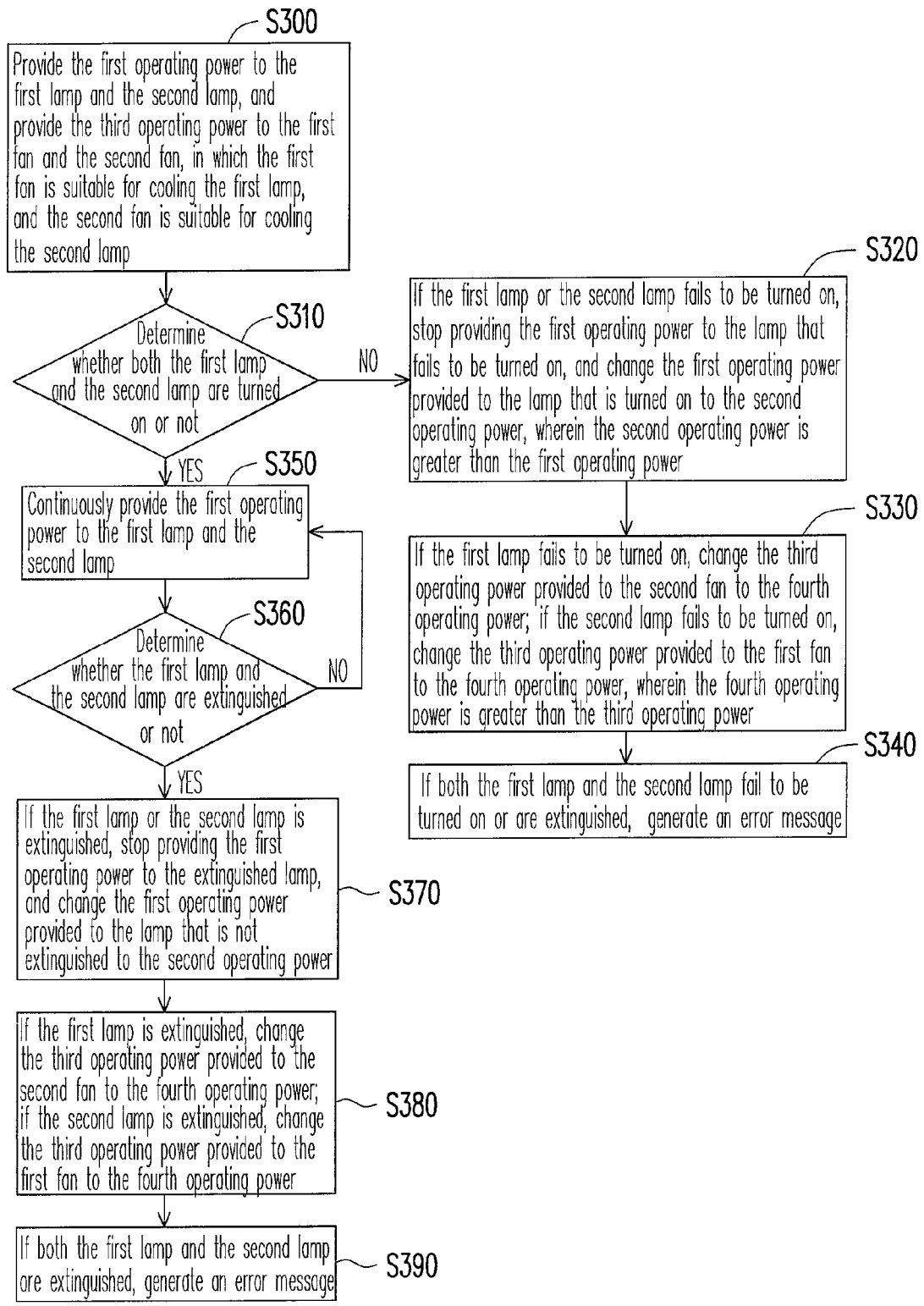
FIG. 4 is a flow chart of a method for controlling a dual lamp module according to a third embodiment of the present invention.

Referring to FIG. 4, a method for controlling a dual lamp module of a third embodiment of the present invention is substantially the same as that of the second embodiment. However, in this embodiment, when the projection apparatus is turned on the power supplier respectively provides the first operating power to the first lamp 110 and the second lamp 120 through the control module 160, and provides the third operating power to the first fan 140 and the second fan 150 (S300). Then, the control module 160 determines whether the first lamp 110 and the second lamp 120 are turned on or not (S310). If the first lamp 110 or the second lamp 120 fails to be turned on, the power supplier stops providing the first operating power to the lamp that fails to be turned on through the control module 160, and changes the first operating power provided to the lamp that is turned on to the second operating power (S320).

Then, if the control module 160 determines that the first lamp 110 fails to be turned on, the power supplier changes the third operating power provided to the second fan 150 to the fourth operating power through the control module 160. Otherwise, if the control module 160 determines that the second lamp 120 fails to be turned on, the power supplier changes the third operating power provided to the first fan 140 to the fourth operating power through the control module 160 (S330). Moreover, if both the first lamp 110 and the second lamp 120 fail to be turned on or are extinguished, the control module 160 generates an error message (S340) to remind the user to replace the first lamp 110 and the second lamp 120.

In addition, if both the first lamp 110 and the second lamp 120 are turned on, the power supplier continuously provides the first operating power to the first lamp and the second lamp through the control module 160 (S350). Steps S360 to S390 are the same as Steps S250 to S270 of the second embodiment, and will not be described herein again.

To sum up, when one of the two lamps fails to be turned on or is extinguished, the projection apparatus increases the operating power of the other lamp by using the method for controlling a dual lamp module of the present invention, so as to enhance the brightness of the illumination beam provided by the lamp, thereby maintain the brightness of images or alleviate attenuation of the brightness of images. Thus, the user does not find obvious sudden reduction of the brightness of images provided by the projection apparatus.

Furthermore, when one of the two lamps fails to be turned on or is extinguished, the speed of the fan corresponding to the lamp that is not extinguished is also increased. Therefore, the over heat of the lamp that is not extinguished caused by over high power for increasing the brightness is prevented, thus avoiding reducing the lifespan of the lamps.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method for controlling a dual lamp module, the dual lamp module comprising a first lamp, a second lamp, a first fan and a second fan, and being applied to a projection apparatus, the method for controlling a dual lamp module comprising:

providing a first operating power to the first lamp;

determining whether the first lamp is turned on or not, if the first lamp fails to be turned on, stopping providing the first operating power to the first lamp, and providing a second operating power to the second lamp, wherein the second operating power is greater than the first operating power; and providing a third operating power to the first fan and the second fan respectively, wherein the first fan is capable of cooling the first lamp, and the second fan is capable of cooling the second lamp, wherein the third operating power provided to the second fan is changed to a fourth operating power if the first lamp is extinguished or fails to be turned on, wherein the third operating power provided to the first fan is changed to the fourth operating power if the second lamp is extinguished or fails to be turned on, and wherein the fourth operating power is greater than or equal to the third operating power.

2. The method for controlling a dual lamp module as claimed in claim 1, wherein if the first lamp is turned on, providing the first operating power to the second lamp.

3. The method for controlling a dual lamp module as claimed in claim 2, after providing the first operating power to the second lamp, further comprising:

determining whether the second lamp is turned on or not, if the second lamp is turned on, continuously providing the first operating power to the first lamp and the second lamp.

4. The method for controlling a dual lamp module as claimed in claim 3, wherein if the second lamp fails to be turned on, the first operating power provided to the second lamp is stopped, and the first operating power provided to the first lamp is changed to the second operating power.

5. The method for controlling a dual lamp module as claimed in claim 3, after continuously providing the first operating power to the first lamp and the second lamp, further comprising:

determining whether the first lamp and the second lamp are extinguished or not, if the first lamp or the second lamp is extinguished, stopping providing the first operating power to the extinguished lamp, and changing the first operating power provided to the lamp that is not extinguished to the second operating power.

6. The method for controlling a dual lamp module as claimed in claim 1, wherein if both the first lamp and the second lamp fail to be turned on or are extinguished, an error message is generated.

7. The method for controlling a dual lamp module as claimed in claim 1, wherein providing the third operating power to the first fan and the second fan respectively is after providing the first operating power to the first lamp.

8. The method for controlling a dual lamp module as claimed in claim 1, wherein the first lamp and the second lamp are bulbs or light emitting diodes.

9. A method for controlling a dual lamp module, the dual lamp module comprising a first lamp, a second lamp, a first fan, and a second fan, and being applied to a projection apparatus, the method for controlling a dual lamp module comprising:

providing a first operating power to the first lamp and the second lamp respectively;

determining whether the first lamp and the second lamp are turned on or not, if the first lamp or the second lamp fails to be turned on, stopping providing the first operating power to the lamp that fails to be turned on, and changing the first operating power provided to the lamp that is turned on to a second operating power, wherein the second operating power is greater than the first operating power; and providing a third operating power to the first fan and the second fan respectively, wherein the first fan is capable of cooling the first lamp, and the second fan is capable of cooling the second lamp, wherein the third operating power provided to the second fan is changed to a fourth operating power if the first lamp is extinguished or fails to be turned on, wherein the third operating power provided to the first fan is changed to the fourth operating power if the second lamp is extinguished or fails to be turned on, and wherein the fourth operating power is greater than or equal to the third operating power.

10. The method for controlling a dual lamp module as claimed in claim 9, wherein if both the first lamp and the second lamp are turned on, continuously providing the first operating power to the first lamp and the second lamp.

11. The method for controlling a dual lamp module as claimed in claim 10, after continuously providing the first operating power to the first lamp and the second lamp, further comprising:

determining whether the first lamp and the second lamp are extinguished, and if the first lamp or the second lamp is extinguished, stopping providing the first operating power to the extinguished lamp, and changing the first operating power provided to the lamp that is not extinguished to the second operating power.

12. The method for controlling the dual lamp module as claimed in claim 9, wherein if both the first lamp and the second lamp fail to be turned on or are extinguished, an error message is generated.

13. The method for controlling a dual lamp module as claimed in claim 9, wherein providing the third operating power to the first fan and the second fan respectively is after providing the first operating power to the first lamp and the second lamp respectively.

14. The method for controlling a dual lamp module as claimed in claim 9, wherein the first lamp and the second lamp are bulbs or light emitting diodes.

* * * * *